(12) United States Patent
Lockyer et al.

(10) Patent No.: US 11,859,544 B1
(45) Date of Patent: Jan. 2, 2024

(54) TURBINE EXHAUST GAS RECIRCULATION MIXER BOX

(71) Applicant: Solar Turbines Incorporated, San Diego, CA (US)

(72) Inventors: John Lockyer, San Diego, CA (US); Jiang Luo, San Diego, CA (US); Stephen Theron, San Diego, CA (US); Stephen Burke, Ontario (CA)

(73) Assignee: Solar Turbines Incorporated, San Diego, CA (US)

( * ) Notice: Subject to any disclaimer, the term of this patent is extended or adjusted under 35 U.S.C. 154(b) by 0 days.

(21) Appl. No.: 17/842,245

(22) Filed: Jun. 16, 2022

(51) Int. Cl.
*F02C 7/00* (2006.01)
*F02C 1/00* (2006.01)

(52) U.S. Cl.
CPC ............... *F02C 7/00* (2013.01); *F02C 1/005* (2013.01)

(58) Field of Classification Search
CPC ... F02C 1/005; F02C 1/08; F02C 3/34; F02M 26/19; F05D 2220/32; F05D 2220/60
See application file for complete search history.

(56) References Cited

U.S. PATENT DOCUMENTS

| | | | | |
|---|---|---|---|---|
| 4,204,401 A | * | 5/1980 | Earnest | F02C 3/34 60/773 |
| 6,237,336 B1 | | 5/2001 | Feucht et al. | |
| 7,140,357 B2 | * | 11/2006 | Wei | F02M 26/19 123/568.17 |
| 9,296,038 B2 | * | 3/2016 | Krichever | F23R 3/283 |
| 9,885,290 B2 | * | 2/2018 | Della-Fera | F02C 3/34 |
| 10,012,184 B2 | * | 7/2018 | Guidi | F02M 26/06 |
| 10,316,802 B2 | | 6/2019 | Shirley | |
| 11,591,991 B1 | * | 2/2023 | McConville | F02M 26/04 |
| 2004/0173192 A1 | * | 9/2004 | Sorter | F02M 26/19 123/568.18 |
| 2009/0229263 A1 | * | 9/2009 | Ouellet | F02C 9/16 60/602 |
| 2010/0126181 A1 | * | 5/2010 | Ranasinghe | F02M 26/35 60/39.52 |

(Continued)

FOREIGN PATENT DOCUMENTS

| | | |
|---|---|---|
| CN | 214887410 U | 11/2021 |
| DE | 102019201735 A1 | 4/2020 |

(Continued)

*Primary Examiner* — Craig Kim
(74) *Attorney, Agent, or Firm* — Procopio, Cory, Hargreaves & Savitch LLP

(57) ABSTRACT

In a closed system that recirculates exhaust gas from a gas turbine engine, recirculated exhaust gas should be mixed into inlet gas in a manner that produces a uniform distribution within the mixed gas, while preventing an excessive pressure drop at the point of mixing, and without needing excessive duct length. Otherwise, the performance of the gas turbine engine may be detrimentally affected. Accordingly, a mixer box is disclosed that injects recirculated exhaust gas into a flow path of inlet gas in a uniform manner. The mixer box may comprise mixer(s) that extend the flow path of the recirculated exhaust gas into the flow path of the inlet gas along two axes. Each mixer may comprise surface apertures and/or interior channels designed to promote uniform ejection of the recirculated exhaust gas from the mixers into the flow path of inlet gas.

19 Claims, 10 Drawing Sheets

(56) References Cited

U.S. PATENT DOCUMENTS

| | | | | |
|---|---|---|---|---|
| 2011/0131981 A1* | 6/2011 | Draper | ...................... | F02C 3/34 |
| | | | | 60/605.2 |
| 2014/0069086 A1* | 3/2014 | Lapointe | ................ | F02M 26/19 |
| | | | | 60/278 |
| 2015/0377146 A1* | 12/2015 | Della-Fera | ................ | F02C 1/08 |
| | | | | 60/39.52 |
| 2022/0403791 A1* | 12/2022 | Iwai | .......................... | F02C 9/50 |

FOREIGN PATENT DOCUMENTS

| | | | | |
|---|---|---|---|---|
| GB | 2364656 A * | 2/2002 | .............. | B01F 5/045 |
| WO | WO-2015199690 A1 * | 12/2015 | ............. | F01K 23/10 |

\* cited by examiner

TURBINE EXHAUST GAS RECIRCULATION MIXER BOX

TECHNICAL FIELD

The embodiments described herein are generally directed to the recirculation of exhaust gas from a turbine, and, more particularly, to a mixer box for mixing exhaust gas from the turbine of a gas turbine engine with the inlet gas to the compressor of the gas turbine engine.

BACKGROUND

In a closed system comprising a gas turbine engine, the exhaust gas from the turbine of the gas turbine engine is recirculated through the system. In particular, the exhaust gas may be mixed with inlet gas (e.g., fresh external air) being supplied to the compressor of the gas turbine engine. The exhaust gas and inlet gas will differ in various characteristics, including temperature, humidity, oxygen ($O_2$) level, carbon dioxide ($CO_2$) level, and/or the like. In addition, the volume of the exhaust gas and the volume of the inlet gas may differ in terms of a percentage of the total gas at the mixing point.

It is important that the two flows are mixed with a minimal pressure drop. An excessive pressure drop at the mixing point will cause back pressure, which will be detrimental to the performance of the gas turbine engine.

Ideally, the mixing mechanism should mix the exhaust gas with the inlet gas to a level of uniformity that is acceptable at the inlet of the compressor, while having no detrimental aerodynamic effects on the performance of the gas turbine engine. In many cases, the available duct length for mixing the flows of exhaust gas and inlet gas may be limited, in which case, the mixing mechanism must be able to achieve the acceptable level of uniformity, despite the limited available duct length.

The present disclosure is directed toward overcoming one or more of the problems discovered by the inventors.

SUMMARY

In an embodiment, a mixer box comprises: a first duct that includes an upstream end and a downstream end, along a first axis, that are both open to form a first flow path through the first duct along the first axis, a first side and second side, along a second axis that is perpendicular to the first axis, the first side comprising one or more openings, and one or more mixers that each extends along the first axis between the upstream end and the downstream end, and extends along the second axis between the first side and the second side, such that the first flow path is divided into a plurality of channels, wherein each of the one or more mixers has an open end, at the first side, that is aligned with one of the one or more openings in the first side, such that a second flow path, perpendicular to the first flow path, is formed through the first side into a hollow interior of the mixer, wherein each of the one or more mixers includes two side surfaces, each of the two side surfaces including a plurality of apertures that each forms a flow path between the hollow interior of the mixer and one of the plurality of channels.

In an embodiment, a system comprises: an air inlet; a gas turbine engine; an exhaust recirculation system; and a mixer box that comprises a first duct that includes an upstream end and a downstream end, along a first axis, that are both open to form a first flow path through the first duct along the first axis, the first flow path in fluid communication with an output of the air inlet on the upstream end and an inlet of the gas turbine engine on the downstream end, a first side and second side, along a second axis that is perpendicular to the first axis, the first side comprising one or more openings, and one or more mixers that each extends along the first axis between the upstream end and the downstream end, and extends along the second axis between the first side and the second side, such that the first flow path is divided into a plurality of channels, wherein each of the one or more mixers has an open end, at the first side, that is aligned with one of the one or more openings in the first side, such that a second flow path, perpendicular to the first flow path, is formed through the first side into a hollow interior of the mixer, each second flow path in fluid communication with an output of the exhaust recirculation system, and wherein each of the one or more mixers includes two side surfaces, each of the two side surfaces including a plurality of apertures that each forms a flow path between the hollow interior of the mixer and one of the plurality of channels.

In an embodiment, a mixer box comprises: a first duct that includes an upstream end and a downstream end, along a first axis, that are both open to form a first flow path through the first duct along the first axis, a first side and second side, along a second axis that is perpendicular to the first axis, the first side comprising a plurality of openings, and a plurality of mixers that each extends along the first axis between the upstream end and the downstream end, and extends along the second axis between the first side and the second side, such that the first flow path is divided into a plurality of channels, wherein each of the plurality of mixers has an open end, at the first side, that is aligned with one of the plurality of openings in the first side, such that a second flow path, perpendicular to the first flow path, is formed through the first side into a hollow interior of the mixer, wherein each of the plurality of mixers includes two side surfaces, each of the two side surfaces including a plurality of apertures that each forms a flow path between the hollow interior of the mixer and one of the plurality of channels, the plurality of apertures, in each of the two side surfaces of each of the plurality of mixers, arranged in two dimensions along both the first axis and the second axis and decreasing in area as a distance from the open end of the mixer increases, wherein each of the plurality of mixers comprises a trailing surface, the trailing surface including a plurality of apertures that each forms a flow path between the hollow interior of the mixer and an exterior of the mixer, the plurality of apertures in each trailing surface of each of the plurality of mixers decreasing in area as a distance from the open end of the mixer increases, and wherein each of the plurality of mixers comprises one or more baffles that each extends along the second axis, such that the hollow interior of the mixer is divided into a plurality of channels along the second axis.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
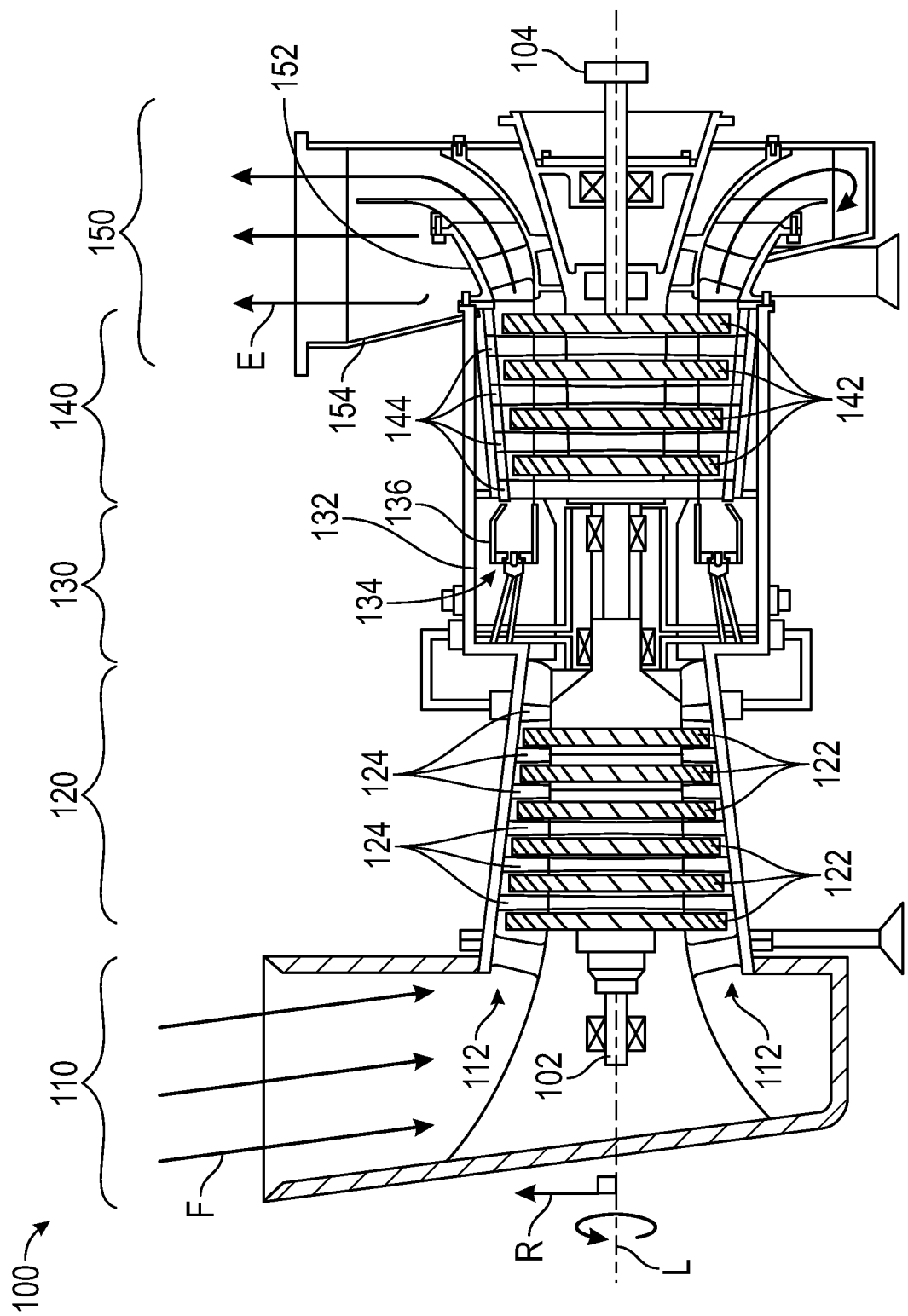
FIG. 1 illustrates a schematic diagram of a gas turbine engine, according to an embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

For clarity and ease of explanation, some surfaces and details may be omitted in the present description and figures. In addition, references herein to "upstream" and "downstream" or "forward" and "aft" are relative to the flow direction of the primary gas (e.g., air) used in the combustion process, unless specified otherwise. It should be understood that "upstream," "forward," and "leading" refer to a position that is closer to the source of the primary gas or a direction towards the source of the primary gas, and "downstream," "aft," and "trailing" refer to a position that is farther from the source of the primary gas or a direction that is away from the source of the primary gas. Thus, a trailing edge or end of a component (e.g., a turbine blade) is downstream from a leading edge or end of the same component. Also, it should be understood that, as used herein, the terms "side," "top," "bottom," "front," "rear," "above," "below," and the like are used for convenience of understanding to convey the relative positions of various components with respect to each other, and do not imply any specific orientation of those components in absolute terms (e.g., with respect to the external environment or the ground).

It should also be understood that the various components illustrated herein are not necessarily drawn to scale. In other words, the features disclosed in various embodiments may be implemented using different relative dimensions within and between components than those illustrated in the drawings.

FIG. 1 illustrates a schematic diagram of a gas turbine engine 100, according to an embodiment. Gas turbine engine 100 comprises a shaft 102 with a central longitudinal axis L. A number of other components of gas turbine engine 100 are concentric with longitudinal axis L and may be annular to longitudinal axis L. A radial axis may refer to any axis or direction that radiates outward from longitudinal axis L at a substantially orthogonal angle to longitudinal axis L, such as radial axis R in FIG. 1. Thus, the term "radially outward" should be understood to mean farther from or away from longitudinal axis L, whereas the term "radially inward" should be understood to mean closer or towards longitudinal axis L. As used herein, the term "radial" will refer to any axis or direction that is substantially perpendicular to longitudinal axis L, and the term "axial" will refer to any axis or direction that is substantially parallel to longitudinal axis L.

In an embodiment, gas turbine engine 100 comprises, from an upstream end to a downstream end, an inlet 110, a compressor 120, a combustor 130, a turbine 140, and an exhaust outlet 150. In addition, the downstream end of gas turbine engine 100 may comprise a power output coupling 104. One or more, including potentially all, of these components of gas turbine engine 100 may be made from stainless steel and/or durable, high-temperature materials known as "superalloys." A superalloy is an alloy that exhibits excellent mechanical strength and creep resistance at high temperatures, good surface stability, and corrosion and oxidation resistance. Examples of superalloys include, without limitation, Hastelloy, Inconel, Waspaloy, Rene alloys, Haynes alloys, Incoloy, MP98T, TMS alloys, and CMSX single crystal alloys.

Inlet 110 may funnel a working fluid F (e.g., the primary gas, such as air) into an annular flow path 112 around longitudinal axis L. Working fluid F flows through inlet 110 into compressor 120. While working fluid F is illustrated as flowing into inlet 110 from a particular direction and at an angle that is substantially orthogonal to longitudinal axis L, it should be understood that inlet 110 may be configured to receive working fluid F from any direction and at any angle that is appropriate for the particular application of gas turbine engine 100. While working fluid F will primarily be described herein as air, it should be understood that working fluid F could comprise other fluids, including other gases.

Compressor 120 may comprise a series of compressor rotor assemblies 122 and stator assemblies 124. Each compressor rotor assembly 122 may comprise a rotor disk that is circumferentially populated with a plurality of rotor blades. The rotor blades in a rotor disk are separated, along the axial axis, from the rotor blades in an adjacent disk by a stator assembly 124. Compressor 120 compresses working fluid F through a series of stages corresponding to each compressor rotor assembly 122. The compressed working fluid F then flows from compressor 120 into combustor 130.

Combustor 130 may comprise a combustor case 132 that houses one or more, and generally a plurality of, fuel injectors 134. In an embodiment with a plurality of fuel injectors 134, fuel injectors 134 may be arranged circumferentially around longitudinal axis L within combustor case 132 at equidistant intervals. Combustor case 132 diffuses working fluid F, and fuel injector(s) 134 inject fuel into working fluid F. This injected fuel is ignited to produce a combustion reaction in one or more combustion chambers 136. The product of the combustion reaction drives turbine 140.

Turbine 140 may comprise one or more turbine rotor assemblies 142 and stator assemblies 144 (e.g., nozzles). Each turbine rotor assembly 142 may correspond to one of a plurality or series of stages. Turbine 140 extracts energy from the combusting fuel-gas mixture as it passes through each stage. The energy extracted by turbine 140 may be transferred via power output coupling 104 (e.g., to an external system), as well as to compressor 120 via shaft 102.

The exhaust E from turbine 140 may flow into exhaust outlet 150. Exhaust outlet 150 may comprise an exhaust diffuser 152, which diffuses exhaust E, and an exhaust collector 154 which collects, redirects, and outputs exhaust E. It should be understood that exhaust E, output by exhaust collector 154, may be further processed, for example, to reduce harmful emissions, recover heat, and/or the like. In addition, while exhaust E is illustrated as flowing out of exhaust outlet 150 in a specific direction and at an angle that is substantially orthogonal to longitudinal axis L, it should be understood that exhaust outlet 150 may be configured to output exhaust E towards any direction and at any angle that is appropriate for the particular application of gas turbine engine 100.

Figure 2:
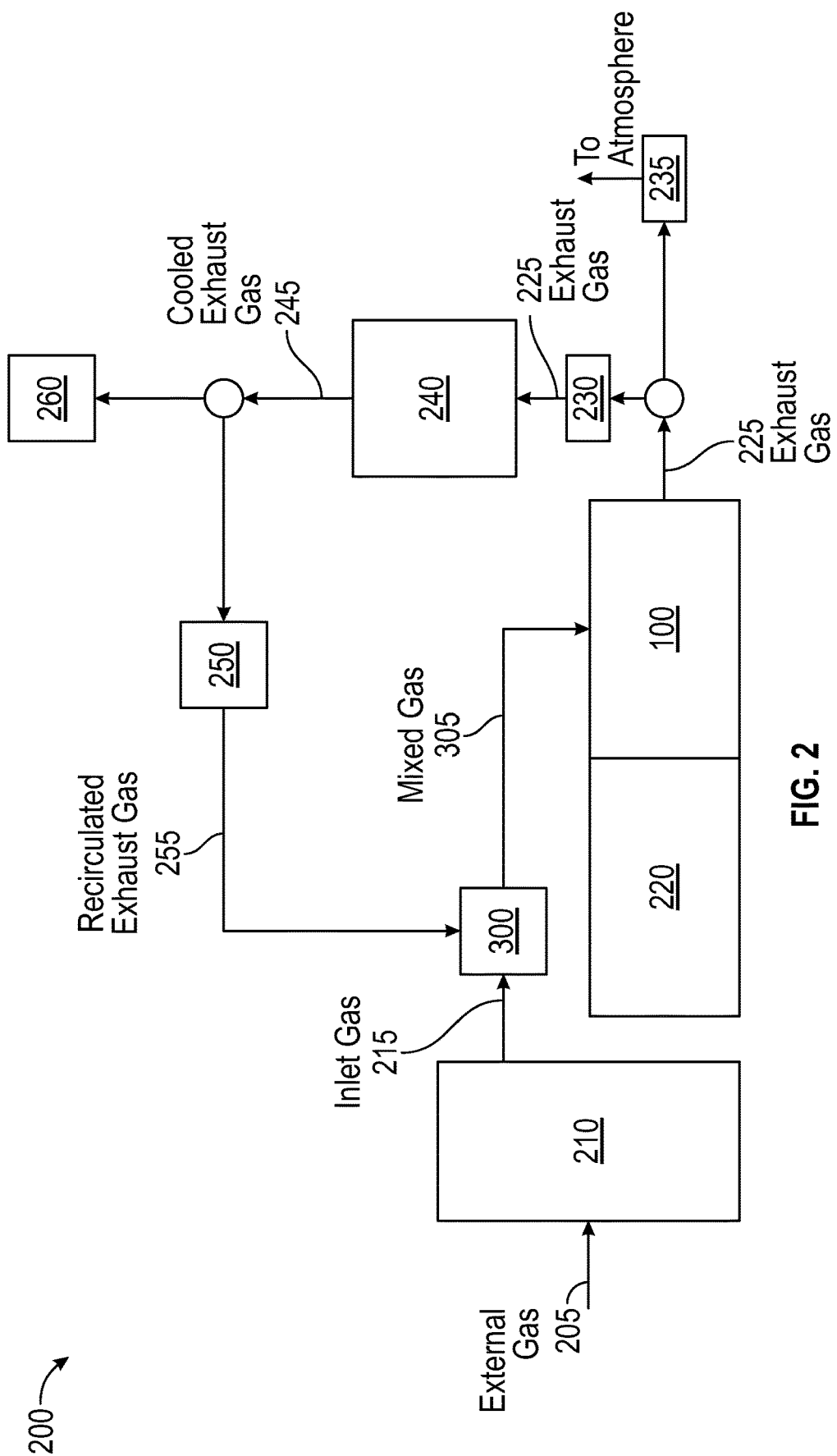
FIG. 2 illustrates a block diagram of an example closed system comprising a gas turbine engine, according to an embodiment.

FIG. 2 illustrates a block diagram of an example closed system 200 comprising a gas turbine engine 100, according to an embodiment. While particular components are illustrated, one or more of the illustrated components may be omitted from closed system 200 and/or additional components may be incorporated into closed system 200. In addition, while a particular arrangement of components is illustrated, the components may be arranged differently within closed system 200.

As illustrated, closed system 200 may comprise an air inlet 210, a mixer box 300, a generator 220, a gas turbine engine 100, valves 230 and 235, a cooling system 240, an oxygen mixer 250, and a carbon-capture system 260. During operation, air inlet 210 may take in and filter an external gas 205, such as fresh air, and introduce the filtered external gas 205 into closed system 200 as inlet gas 215. Inlet gas 215 and recirculated exhaust gas 255 may flow into mixer box 300, where they are mixed together to produce mixed gas 305. Mixed gas 305 flows, as working fluid F, into gas turbine engine 100 (e.g., into inlet 110), which may power generator 220 (e.g., via output coupling 104). As described above, gas turbine engine outputs exhaust E (e.g., via exhaust outlet 150), as exhaust gas 225.

Exhaust gas 225 may flow through an exhaust recirculation system, comprising valve 230, cooling system 240, and/or oxygen mixer 250. During startup or during a non-recirculation cycle, valve 230 may be closed while valve 235 is opened, such that exhaust gas 225 is released to the atmosphere. To begin recirculating exhaust gas 225, valve 230 transitions to fully open, while valve 235 transitions to fully closed, such that exhaust gas 225 will flow into cooling system 240. Conversely, during shutdown, valve 235 may transition to fully open, while valve 230 transitions to fully closed. Cooling system 240 may cool exhaust gas 225 to produce cooled exhaust gas 245. Cooling system 240 may comprise a direct contact cooler (DCC). Cooled exhaust gas 245 may flow from cooling system 240 and be split into at least two paths. For instance, cooled exhaust gas 245 may be split into a first path to an oxygen mixer 250 and a second path to a carbon-capture system 260, according to a set or controlled ratio (e.g., 45% to oxygen mixer 250, and 55% to carbon-capture system 260). Oxygen mixer 250 may mix cooled exhaust gas 245 with oxygen to produce recirculated exhaust gas 255, which, as mentioned above, is mixed with inlet gas 215 in mixer box 300 to produce mixed gas 305 as working fluid F for gas turbine engine 100. Carbon-capture system 260 may capture and store, sequester, or use (e.g., for fracking) carbon dioxide within cooled exhaust gas 245. It should be understood that this recirculation of exhaust gas through closed system 200 may be continuous throughout operation of gas turbine engine 100 within closed system 200.

Figure 3:
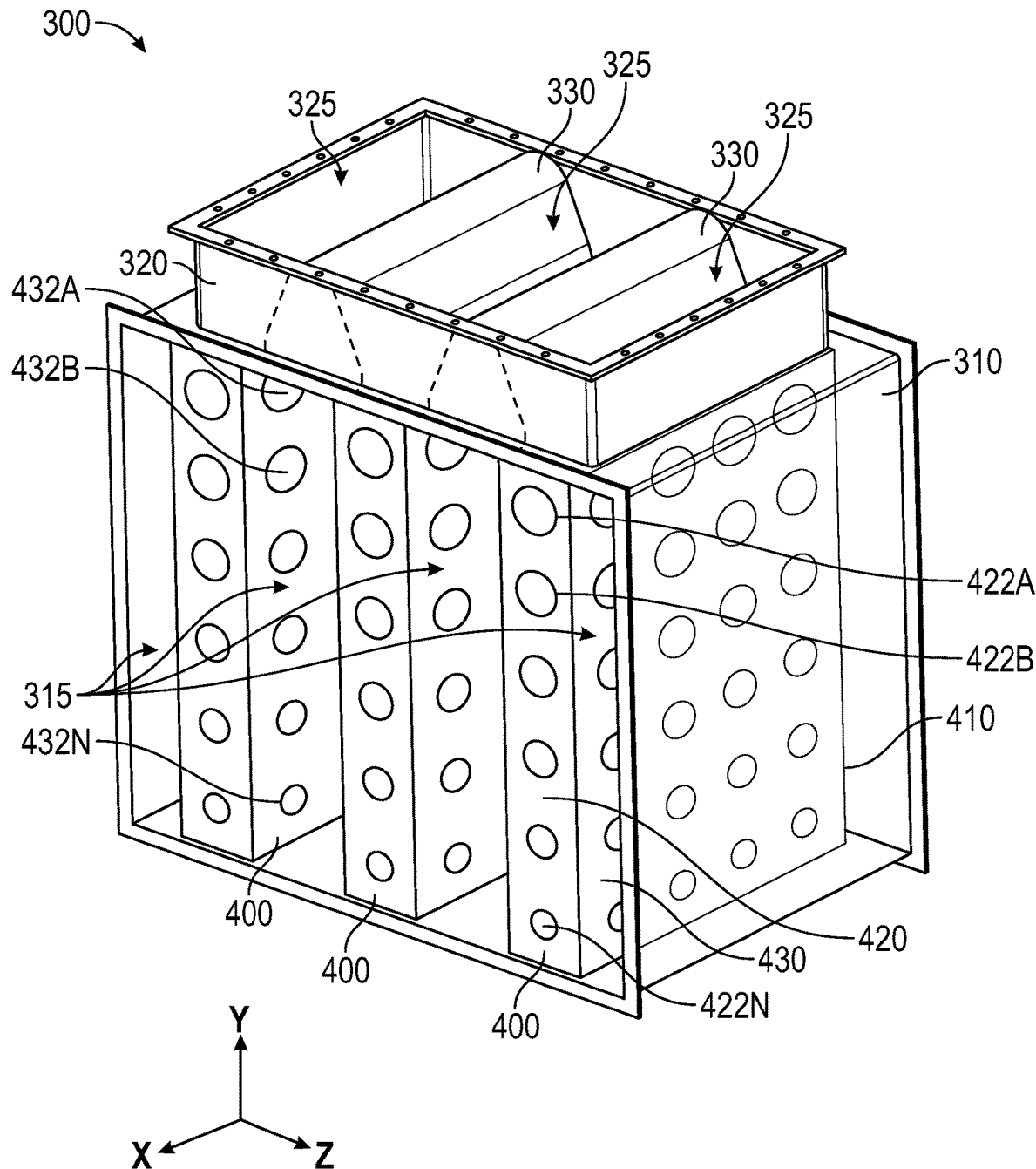
FIG. 3 illustrates a perspective view of a mixer box, according to an embodiment.

FIG. 3 illustrates a perspective view of mixer box 300, according to an embodiment. Mixer box 300 is illustrated and described herein with respect to a set of axes X, Y, and Z. In the closed system 200, illustrated in FIG. 2, the X axis of mixer box 300 is parallel to longitudinal axis L of gas turbine engine 100, and the upstream and downstream directions are the same for mixer box 300 as for gas turbine engine 100. However, it should be understood that the X axis of mixer box 300 may be oriented in any manner, relative to longitudinal axis L of gas turbine engine 100, and/or the upstream and downstream directions of mixer box 300 may differ from the upstream and downstream directions of gas turbine engine 100, depending on the particular design goals and constraints.

Mixer box 300 may comprise a first duct 310 forming a first flow path for inlet gas 215 along the X axis, and a second duct 320 forming a second flow path for recirculated exhaust gas 255 along the Y axis. For example, first duct 310 may comprise a cuboid with open sides (i.e., in Y-Z planes) on opposing ends along the X axis, representing the upstream end and downstream end of first duct 310 with respect to the first flow path for inlet gas 215. Similarly, second duct 320 may comprise a cuboid with open sides (i.e., in X-Z planes) on opposing ends along the Y axis, representing the upstream end and downstream end of second duct 320 with respect to the second flow path for recirculated exhaust gas 255. One of these open sides of second duct 320 may face one or a plurality of openings in a side (i.e., in an X-Z plane) of first duct 310 that is perpendicular to the Y axis, such that the second flow path for recirculated exhaust gas 255 flows into the first flow path for inlet gas 215. First duct 310 and second duct 320 may be formed as two separate ducts (e.g., from the same material or different materials) that are permanently fixed to each other (e.g., via welding) or detachably fixed to each other (e.g., via nuts and bolts, screws, and/or other fastening means) in the described configuration. Alternatively, first duct 310 and second duct 320 could be formed as a single integral duct (e.g., from the same material).

First duct 310 may house one or a plurality of mixers 400. In the illustrated embodiment, first duct 310 houses three mixers 400. However, first duct 310 may house any number of mixers 400, depending on the particular design goals and constraints, including one mixer 400, two mixers 400, four mixers 400, and so on. Each mixer 400 may be a cuboid structure that extends along the X axis between the two open upstream and downstream ends of first duct 310, and along the Y axis from a first side of first duct 310 to which second duct 320 is affixed to an opposing second side of first duct 310. Each mixer 400 may have a hollow interior with an open end at the first side of first duct 310 that is aligned with an opening through the first side of first duct 310 that is within the second flow path through second duct 320. Mixers 400 may be spaced (e.g., equidistantly) apart along the Z axis, such that cuboid channels 315 are formed between adjacent mixers 400 and/or between a mixer 400 and a side of first duct 310 that is within an X-Y plane.

Each mixer 400 may comprise a leading surface 410 facing in an upstream direction of first duct 310, a trailing surface 420 facing in a downstream direction of first duct 310, and two side surfaces 430 extending between leading surface 410 and trailing surface 420. Each trailing surface 420 may comprise at least one aperture 422. Preferably, each trailing surface 420 comprises a plurality of apertures 422, illustrated as apertures 422A, 422B, to 422N, aligned in at least one dimension along the Y axis. Similarly, each side surface 430 may comprise at least one aperture 432. Preferably, each side surface 430 comprises a plurality of apertures 432, illustrated as apertures 432A, 432B, to 432N, aligned in two dimensions along both the X and Y axes. While a certain arrangement of apertures 422 and 432 are illustrated, it should be understood that other arrangements are possible, such as, for example, two dimensions of apertures 422 through trailing surface 420 along both the Y and Z axes. In any case, each aperture 422 and 432 forms a flow path between the hollow interior of mixer 400, such that the hollow interior of mixer 400 is in fluid communication with the exterior of mixer 400, including channels 315.

Second duct 320 may house one or a plurality of fairings 330. In the illustrated embodiment, second duct 320 houses two fairings 330. However, second duct 320 may house any number of fairings 330, depending on the particular design goals and constraints, including one fairing 330, three fairings 330, four fairings 330, and so on. Each fairing 330 may comprise a generally U-shaped or V-shaped structure, with a particular profile corresponding to desired aerodynamics, and with a vertex that faces the open end of second duct 320 that is opposite the end of second duct 320 that is affixed to first duct 310. Thus, each fairing 330 acts to split the flow path of a gas entering the open end of second duct 320 into two separate flow paths 325. In the illustrated embodiment, two fairings 330 split the flow path into three separate flow paths 325.

Each flow path 325 may correspond to one mixer 400 in first duct 310. In other words, the side of first duct 310 to which second duct 320 is affixed may comprise, for each flow path 325, an opening that is aligned with both that flow path 325 and an open end of one of mixers 400. Consequently, gas flowing along a flow path 325 flows through the aligned opening and into the aligned mixer 400. Thus, it should be understood that the number of mixers 400, the number of openings in the side of first duct 310 to which second duct 320 is affixed, and the number of channels 325, in mixer box 300, may all be the same. In addition, this number may be one more than the number of fairings 330 in mixer box 300.

Figure 4:
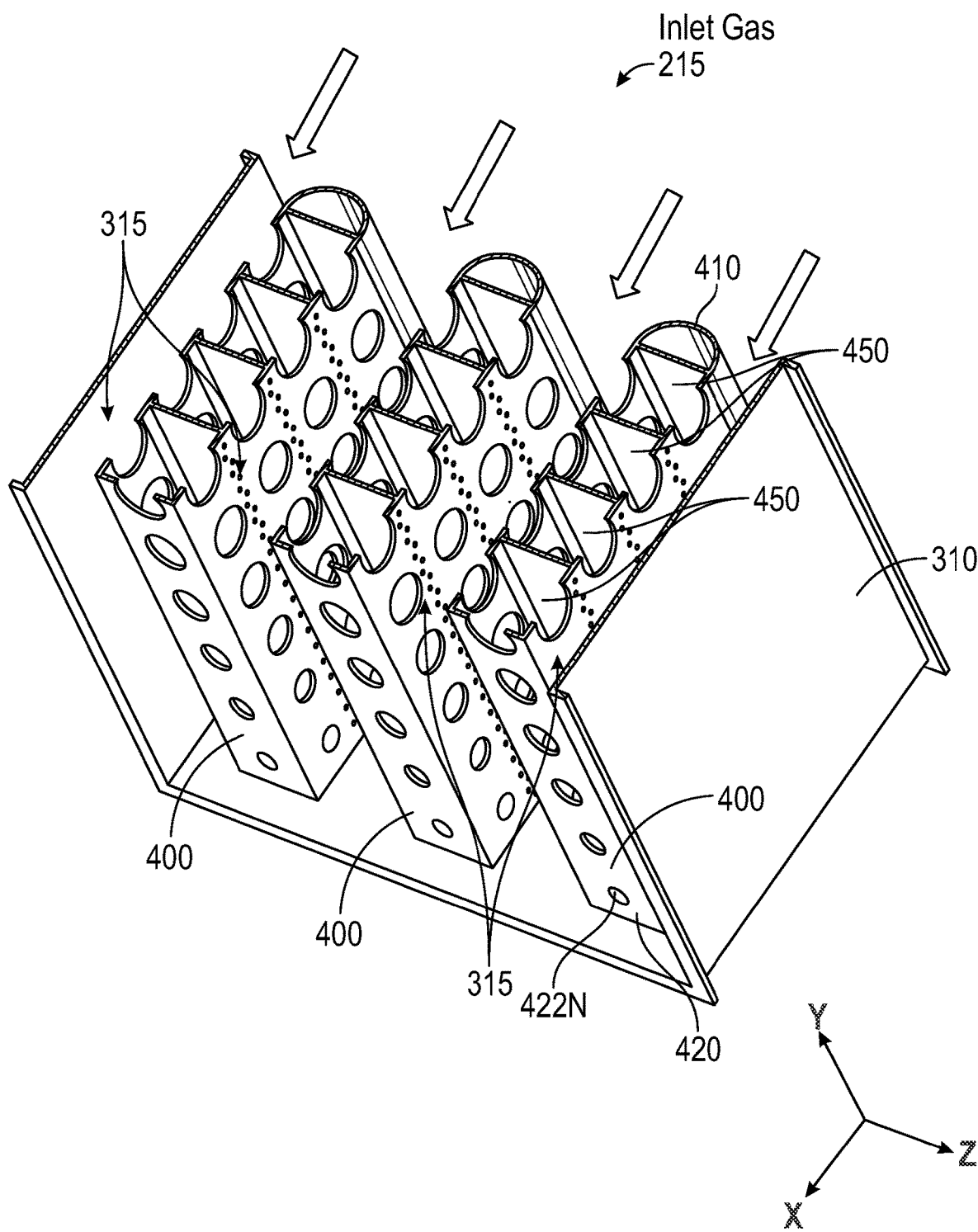
FIG. 4 illustrates a cross-sectional perspective view of a mixer box, according to an embodiment.

FIG. 4 illustrates a cross-sectional perspective view of mixer box 300, cut in an X-Z plane, according to an embodiment. As illustrated, leading surface 410 of mixer 400 may be generally U-shaped or V-shaped, with a profile corresponding to desired aerodynamics, and with a vertex that faces the open upstream end of first duct 310. Thus, leading surface 410 acts to split the flow path of inlet gas 215 entering the upstream end of first duct 310 into two separate channels 315 with a mixer 400 between each pair of adjacent channels 315. In other words, inlet gas 215 is split into separate channels 315 to flow between mixers 400. In the illustrated embodiment, three leading surfaces 410 of three mixers 400 split the flow path into four separate channels 315.

Each mixer 400 may comprise one or a plurality of baffles 450 that divide the hollow interior of mixer 400 into distinct channels or columns that extend along the Y axis. In the illustrated embodiment, each mixer 400 comprises four baffles 450, thereby dividing the hollow interior of mixer 400 into four distinct channels. Notably, the hollow region formed by leading surface 410 and the forward-most baffle 450 is not considered a channel, because, in the illustrated embodiments, this hollow region is fully enclosed with no inlet or outlet. However, in an alternative embodiment, this hollow region could comprise an inlet and/or one or more outlets, so as to form a channel that may act in the same or similar manner as the other channels within mixer 400.

Figure 5:
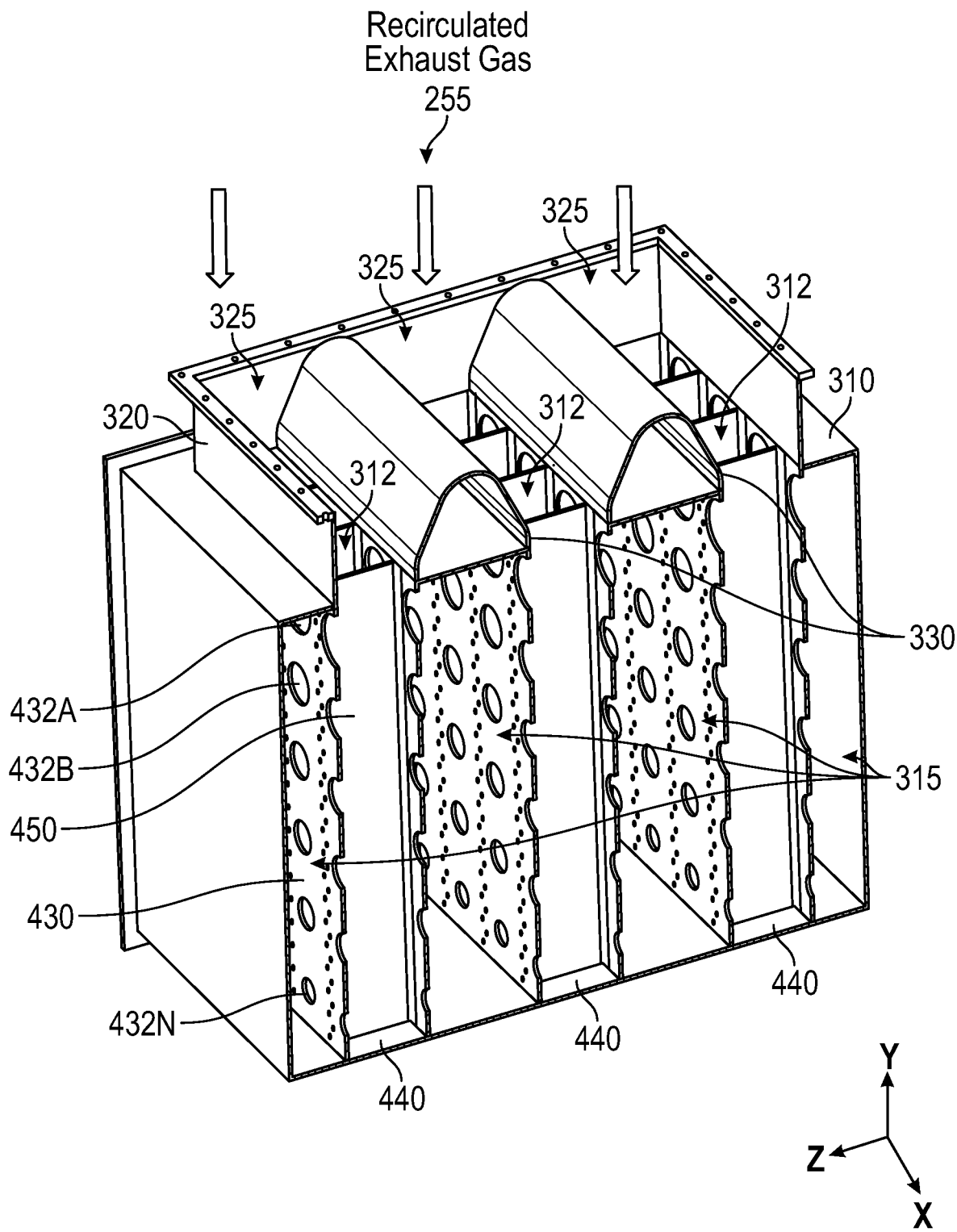
FIG. 5 illustrates a cross-sectional perspective view of a mixer box, according to an embodiment.

FIG. 5 illustrates a cross-sectional perspective view of mixer box 300, cut in a Y-Z plane, according to an embodiment. Each fairing 330 splits a flow path of recirculated exhaust gas 255 into two separate flow paths 325. Each flow path 325 is aligned with an opening 312 in the side of first duct 310 to which second duct 320 is affixed. In addition, each mixer 400 is aligned with one of these openings 312. Thus, recirculated exhaust gas 255 is split into separate flow paths 325 to flow through openings 312 in first duct 310 into the hollow interiors of mixers 400. In an embodiment in which each mixer 400 comprises baffles 450, recirculated exhaust gas 255 is further divided into the separate channels formed by baffles 450 within the hollow interior of mixer 400. Notably, the use of baffles 450 to divide the hollow interior of mixer 400 helps to prevent the formation of a vortex within mixer 400. A vortex could cause an area of low pressure within the hollow interior of mixer 400, which may cause gas from the exterior of mixer 400 to flow into the hollow interior of mixer 400, referred to as "ingress," via apertures 422 and/or 432.

As illustrated, each mixer 400 may be open on the end that abuts the side of first duct 310 that comprises openings 312, such that recirculated exhaust gas 255 may flow into the hollow interior of each mixer 400 through the open end of mixer 400. In addition, each mixer 400 may comprise a base plate 440 on the end of mixer 400 that is opposite the open end of mixer 400, along the Y axis. In an alternative embodiment, base plate 440 may be omitted, since the end of mixer 400 that would otherwise have base plate 440 may instead be closed by the side of first duct 310. However, the use of base plate 440 may facilitate fastening of mixer 400 to first duct 310, for example, via welding.

Figure 6:
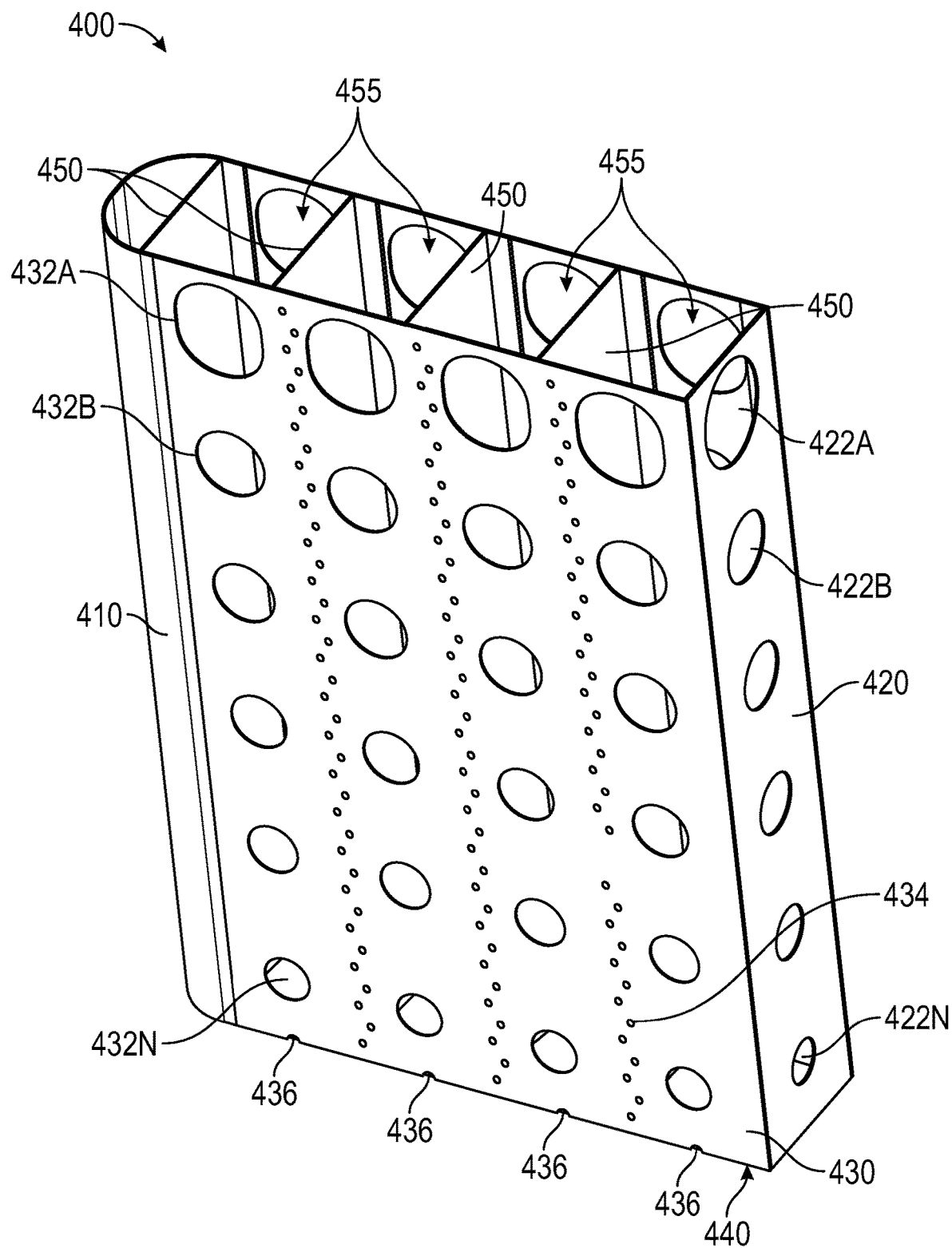
FIG. 6 illustrates a perspective view of a single mixer in isolation, according to an embodiment.

FIG. 6 illustrates a perspective view of a single mixer 400 in isolation, according to an embodiment. As illustrated, apertures 422 in trailing surface 420 may have larger areas (e.g., diameters) closer to the open end of mixer 400 and smaller areas (e.g., diameters) closer to the closed end of mixer 400, having base plate 440. In particular, the area of apertures 422 may gradually decrease from the open end to the closed end. For example, aperture 422A has the largest area, aperture 422N has the smallest area, and apertures 422 between aperture 422A and aperture 422N, such as aperture 422B, have smaller areas than aperture 422A, but larger areas than aperture 422N. While apertures 422 are described as gradually decreasing in area, two or more apertures 422 from the open end to the closed end may have the same areas, and/or the areas of apertures 422 may decrease from the open end to the closed end at a non-uniform or non-gradual rate. The decreasing areas of apertures 422 from the open end to the closed end of mixer 400 promotes more uniform mixing by biasing the areas of apertures 422 towards apertures 422 near the open end of mixer 400. This compensates for the crossflow phenomenon that diminishes the flow of recirculated exhaust gas 255 through apertures 422 at the open end of mixer 400, relative to apertures 422 at the closed end of mixer 400.

Similarly and for the same reasons, apertures 432 in each side surface 430 may have larger areas (e.g., diameters) closer to the open end of mixer 400 and smaller areas (e.g., diameters) closer to the closed end of mixer 400, having base plate 440. In particular, the area of apertures 432 may gradually decrease from the open end to the closed end. For example, aperture 432A has the largest area, aperture 432N has the smallest area, and apertures 432 between aperture 432A and aperture 432N, such as aperture 432B, have smaller areas than aperture 432A, but larger areas than aperture 432N. While apertures 432 are described as gradually decreasing in area, two or more apertures 432 from the open end to the closed end may have the same areas, and/or the areas of apertures 432 may decrease from the open end to the closed end at a non-uniform or non-gradual rate.

As illustrated, apertures 432 may be formed in two dimensions through each side surface 430. In this case, each column of apertures 432, extending from the open end to the closed end of mixer 400, may have the same configuration of apertures 432. Thus, every aperture 432 in each row of apertures 432, extending from leading surface 410 to trailing surface 420, may have the same area. While four columns of apertures 432 and six rows of apertures 432 are illustrated, it should be understood that side surface 430 may comprise any number of columns and rows of apertures 432, depending on the particular design goals and constraints. In addition, while trailing surface 420 is illustrated with only a single column of apertures 422, trailing surface 420 could be configured with multiple columns of apertures 422 in a similar or identical manner as side surface 430.

In the illustrated embodiment, each column of apertures 432 in each side surface 430 is identical in terms of the number, arrangement, and areas of apertures 432. In addition, the column of apertures 422 is identical, in terms of the number, arrangement, and areas of apertures 422, as each column of apertures 432. In an alternative embodiment, each column of apertures 432, within each side surface 430, may have different numbers, arrangements, and/or areas of apertures 432 than one or more other columns of apertures 432 in the same side surface 430 and/or different side surfaces 430. Additionally or alternatively, each column of apertures 422, within each trailing surface 420, may have different numbers, arrangements, and/or areas of apertures 422 than one or more columns in the same trailing surface 420 and/or different trailing surfaces 420 and/or one or more columns of apertures 432 in one or more side surfaces 430.

Between each pair of adjacent columns of apertures 432 through each side surface 430 a plurality of plug-weld holes 434 may be formed. In the illustrated embodiment, a set of two staggered lines of plug-weld holes 434 are formed between each adjacent column of apertures 432. However, in alternative embodiments, fewer or more lines of plug-weld holes 434 may be formed and/or a different arrangement of plug-weld holes 434 may be formed between adjacent columns of apertures 432. Plug-weld holes 434 are aligned with the sides of baffles 450 within the hollow interior of mixer 400, such that baffles 450 may be welded to side surfaces 430 through plug-weld holes 434.

In addition, each side surface 430 may comprise one or a plurality of drainage holes 436, along the edge of side surface 430 that abuts base plate 440. Each drainage hole 436 may align with a channel (e.g., the center of the channel) formed within the hollow interior of mixer 400 by baffle(s) 450. Thus, in the illustrated embodiment, a drainage hole 436 is formed at the base of each column of apertures 432, since each column corresponds to one of the channels within the hollow interior of mixer 400. Since the gas within mixer box 300 may be very humid, condensate may form with the hollow interior of mixer 400. Each drainage hole 436 enables condensate that forms within a respective channel to flow out of the hollow interior of mixer 400 into channels 315, so that the condensate does not collect within mixers 400. Rather, the condensate exits mixers 400 via drainage holes 436 and is reintroduced into the gases mixing within channels 315. In an embodiment, the surface of base plate 440 within the hollow interior of mixer 400 could be contoured, creased, grooved, or otherwise configured to guide condensate to drainage holes 436. Alternatively, mixer 400 may rely solely on the pressure differential between the interior and exterior of mixer 400 to force condensate out of drainage holes 436.

Figure 7:
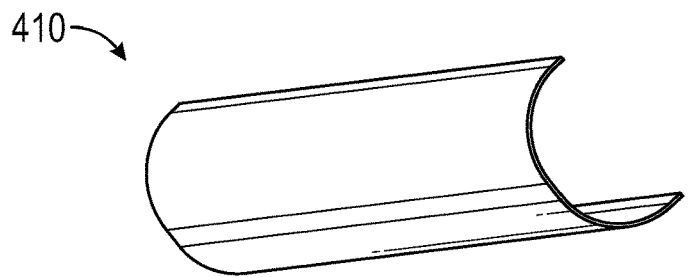
FIG. 7 illustrates a perspective view of a leading surface of a mixer in isolation, according to an embodiment.

FIG. 7 illustrates a perspective view of leading surface 410 in isolation, according to an embodiment. As illustrated, leading surface 410 may have a generally U-shaped or V-shaped profile. Leading surface 410 may be formed from a single material that is bent to the desired curvature. The long edges of leading surface 410 may be welded or otherwise affixed to respective side surfaces 430.

Figure 8:
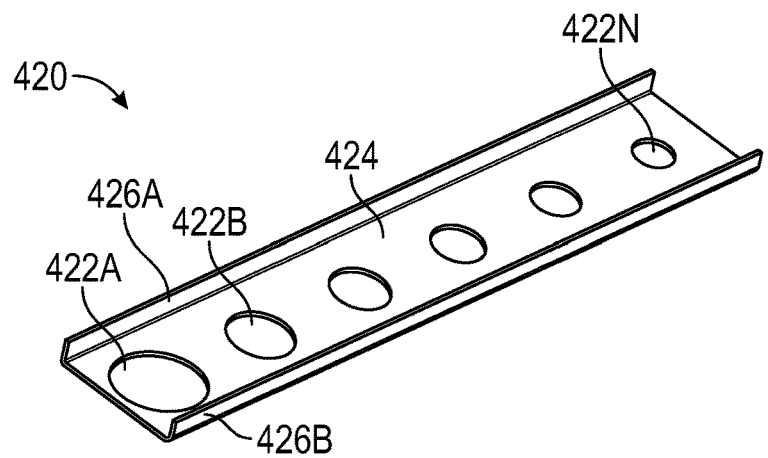
FIG. 8 illustrates a perspective view of a trailing surface of a mixer in isolation, according to an embodiment.

FIG. 8 illustrates a perspective view of trailing surface 420 in isolation, according to an embodiment. As illustrated, trailing surface 420 may comprise a substrate 424, comprising apertures 422 (e.g., 422A, 422B, . . . 422N), with two side portions 426A and 426B on each long side of substrate 424. Substrate 424 and side portions 426A and 426B may be integrally formed from a single piece of material, or may be formed as separate pieces of material that are joined together in any suitable manner. Trailing surface 420 may be welded or otherwise affixed to respective side surfaces 430 at side portions 426A and 426B.

Figure 9:
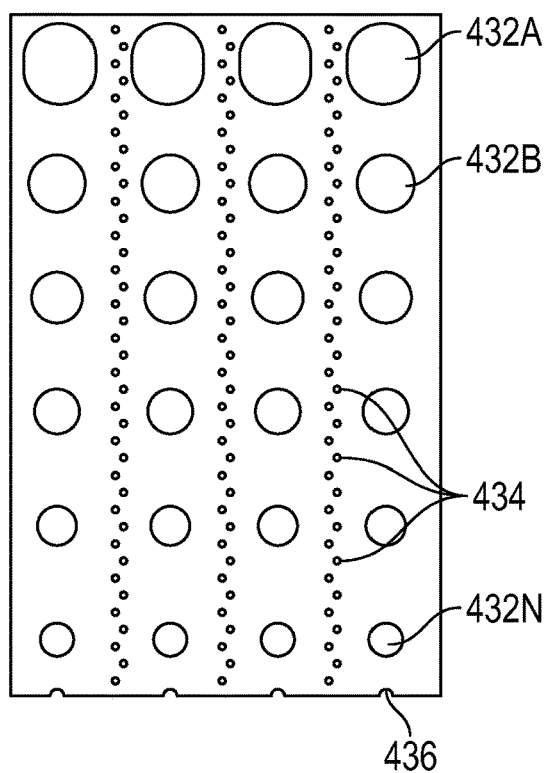
FIG. 9 illustrates an elevation view of a side surface of a mixer in isolation, according to an embodiment.

FIG. 9 illustrates an elevation view of side surface 430 in isolation, according to an embodiment. It should be understood that each mixer 400 may comprise two identical side surfaces 430. As discussed elsewhere herein, each side surface 430 may comprise a plurality of columns of apertures 432 (e.g., 432A, 432B, . . . 432N). Each column of apertures 432, which will align with channels within the hollow interior of mixer 400, may also comprise a drainage hole 436, formed as a notch within an edge of side surface 430 that will be affixed to base plate 440. In addition, at least one line of plug-weld holes 434 may be formed between adjacent columns of apertures 432, so as to align with a respective baffle 450 within the hollow interior of mixer 400. In the illustrated embodiment, two staggered lines of plug-weld holes 434 are provided for each baffle 450. It should be understood that a baffle 450 may be welded to side surface 430 by aligning the baffle 450 with a set of plug-weld holes 434, and welding through the plug-weld holes 434.

Figure 10:
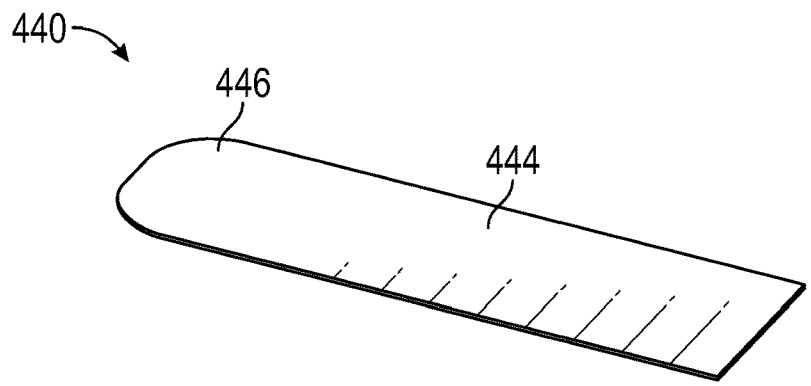
FIG. 10 illustrates a perspective view of a base plate of a mixer in isolation, according to an embodiment.

FIG. 10 illustrates a perspective view of base plate 440 in isolation, according to an embodiment. As illustrated, base plate 440 may comprise a generally rectangular portion 444 that has a profile that corresponds to the profile of an assembly including trailing surface 420 and two side surfaces 440, and a generally U-shaped or V-shaped portion 446 that has a profile that corresponds to the profile of leading surface 410. In other words, base plate 440 has a profile that matches the profile of mixer 400 in an X-Z plane, so as to fully close one end of mixer 400 along the Y axis.

Figure 11:
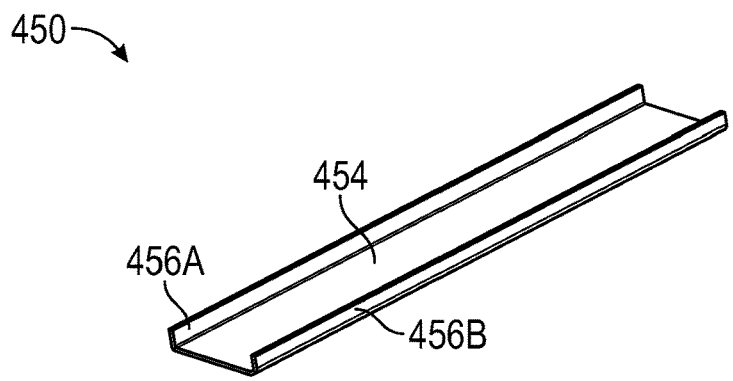
FIG. 11 illustrates a perspective view of a baffle of a mixer in isolation, according to an embodiment.

FIG. 11 illustrates a perspective view of baffle 450 in isolation, according to an embodiment. As illustrated, baffle 450 may comprise a substrate 454, with two side portions 456A and 456B on each long side of substrate 454. Substrate 454 and side portions 456A and 456B may be integrally formed from a single piece of material, or may be formed as separate pieces of material that are joined together in any suitable manner. Baffle 450 may be welded or otherwise affixed between a pair of side surfaces 430 at side portions 456A and 456B (e.g., by welding through corresponding plug-weld holes 434 through side surfaces 430). It should be understood that each baffle 450 may be identical.

Figure 12:
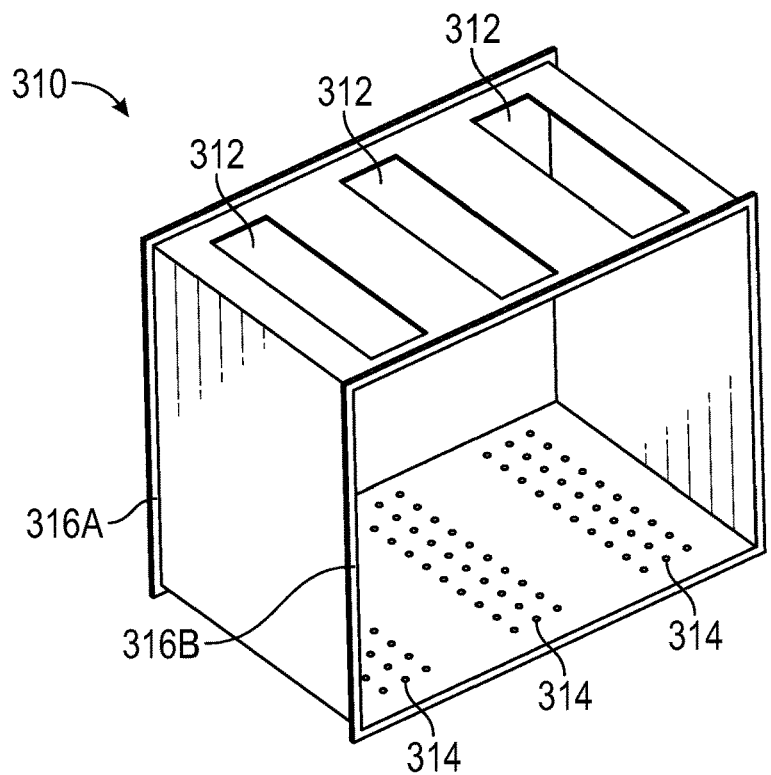
FIG. 12 illustrates a perspective view of a duct of a mixer box in isolation, according to an embodiment.

FIG. 12 illustrates a perspective view of first duct 310 in isolation, according to an embodiment. As illustrated, flanges 316 (e.g., 316A and 316B) are formed around both open ends of first duct 310 to facilitate joining of first duct 310 within a duct system of closed system 200. In particular, leading flange 316A may be affixed (e.g., permanently via welding, or detachably via nuts and bolts, screws, etc.) to a corresponding flange on a duct that supplies inlet gas 215, and trailing flange 316B may be affixed (e.g., permanently via welding, or detachably via nuts and bolts, screws, etc.) to a corresponding flange on a duct that supplies mixed gas 305 as working fluid F to gas turbine engine 100. The two open ends of first duct 310 form a primary flow path through first duct 310, whereas openings 312, through a side that is in a plane that is parallel to the primary flow path, form secondary flow paths into first duct 310. In the illustrated embodiment, the primary and secondary flow paths meet at a perpendicular (i.e., 90-degree) angle. However, it should be understood that in alternative embodiments, the primary and secondary flow paths may be configured to meet at a non-perpendicular angle, for example, by adjusting the shape of first duct 310, adjusting the shape of second duct 320, adding additional components, and/or the like.

First duct 310 may also comprise lines of plug-weld holes 314 on a side opposite openings 312. In the illustrated embodiment, three lines of plug-weld holes 314 are formed in each of three sets, with each set corresponding to one mixer 400. It should be understood that the number of sets of plug-weld holes 314 will be equal to the number of mixers 400 to be housed within first duct 310 (e.g., three in the illustrated example), and that the number of plug-weld holes 314 in each line and/or the number of lines of plug-weld holes 314 may be set to any suitable number. In any case, each mixer 400 may be aligned with a respective set of plug-weld holes 314, and then welded to first duct 310 from the exterior of first duct 310 through plug-weld holes 314.

Figure 13:
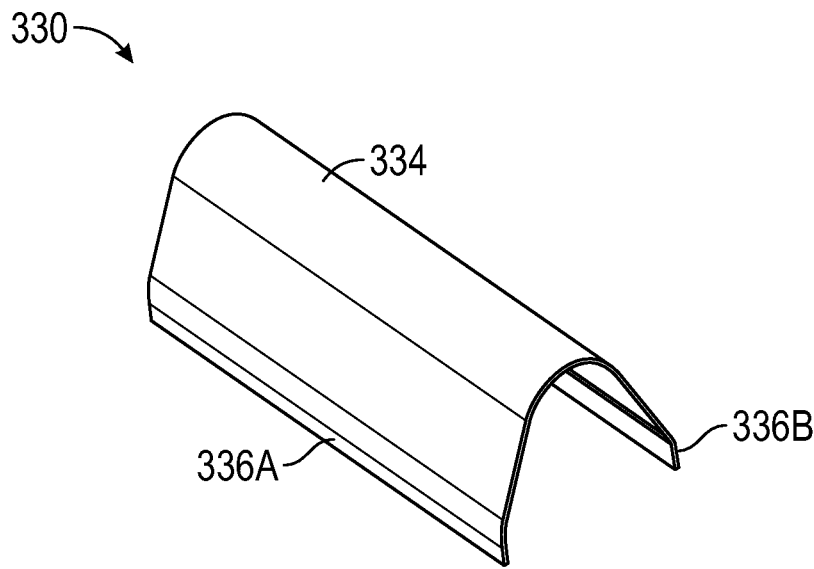
FIG. 13 illustrates a perspective view of a fairing of a mixer box in isolation, according to an embodiment.

FIG. 13 illustrates a perspective view of fairing 330 in isolation, according to an embodiment. Each fairing 330 may be formed as a generally U-shaped or V-shaped structure 334 with flat portions 336A and 336B on either side. Curved structure 334 and flat portions 326A and 326B may be integrally formed from a single piece of material, or may be formed as separate pieces of material that are joined together in any suitable manner. Fairing 330 may be welded to second duct 320 at the edges of curved structure 334 and/or welded to the edges of openings 312 of first duct 310 at flat portions 336A and 336B.

Figure 14:
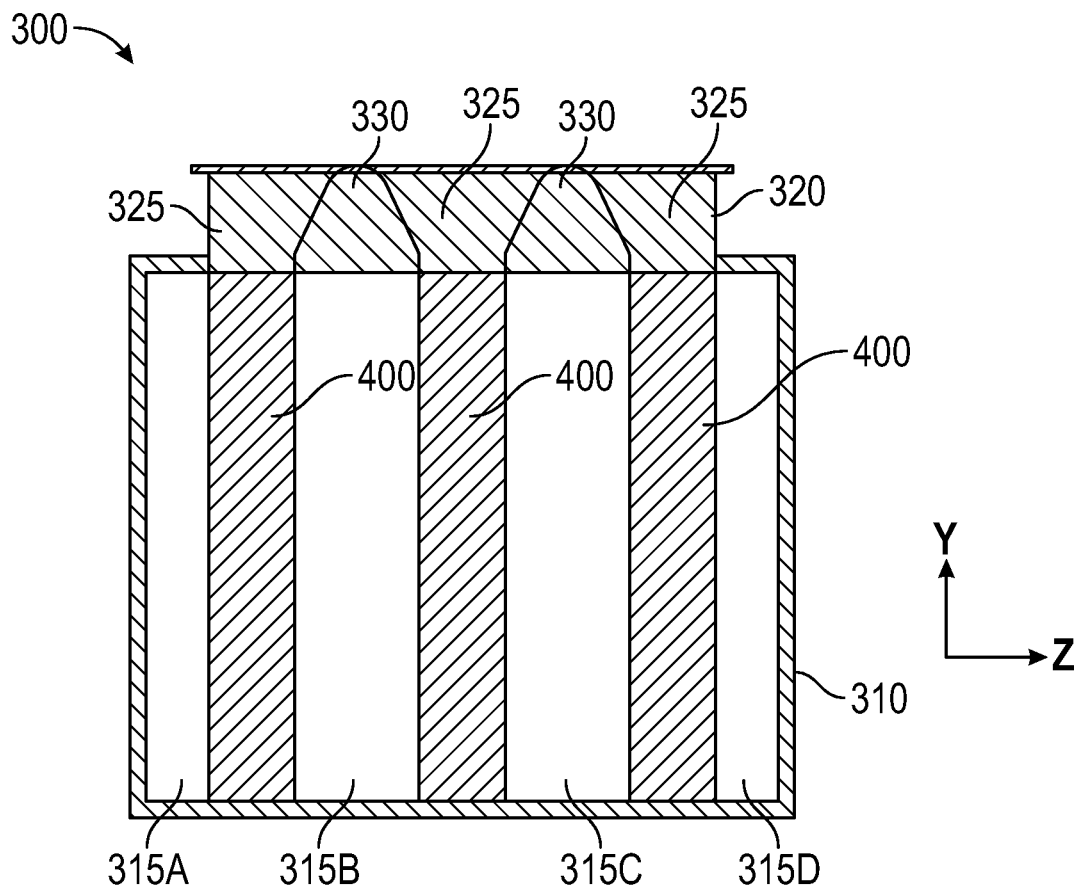
FIG. 14 illustrates a profile of a mixer box, according to an embodiment.

FIG. 14 illustrates a profile of mixer box 300 in the Y-Z plane (i.e., looking down the X axis), according to an embodiment. In an embodiment, the total area of channels 315 is greater than the total area of mixers 400 in this profile. For example, the total area of channels 315 may be 57% or more of the total cross-sectional area through mixer box 300. In addition, each interior channel 315, illustrated as interior channels 315B and 315C, may have twice the cross-sectional area as each outer channel 315A and 315D, since interior channels 315B and 315C receive twice the amount of recirculated exhaust gas 255 (i.e., from two side surfaces 430 of adjacent mixers 400).

Figure 15:
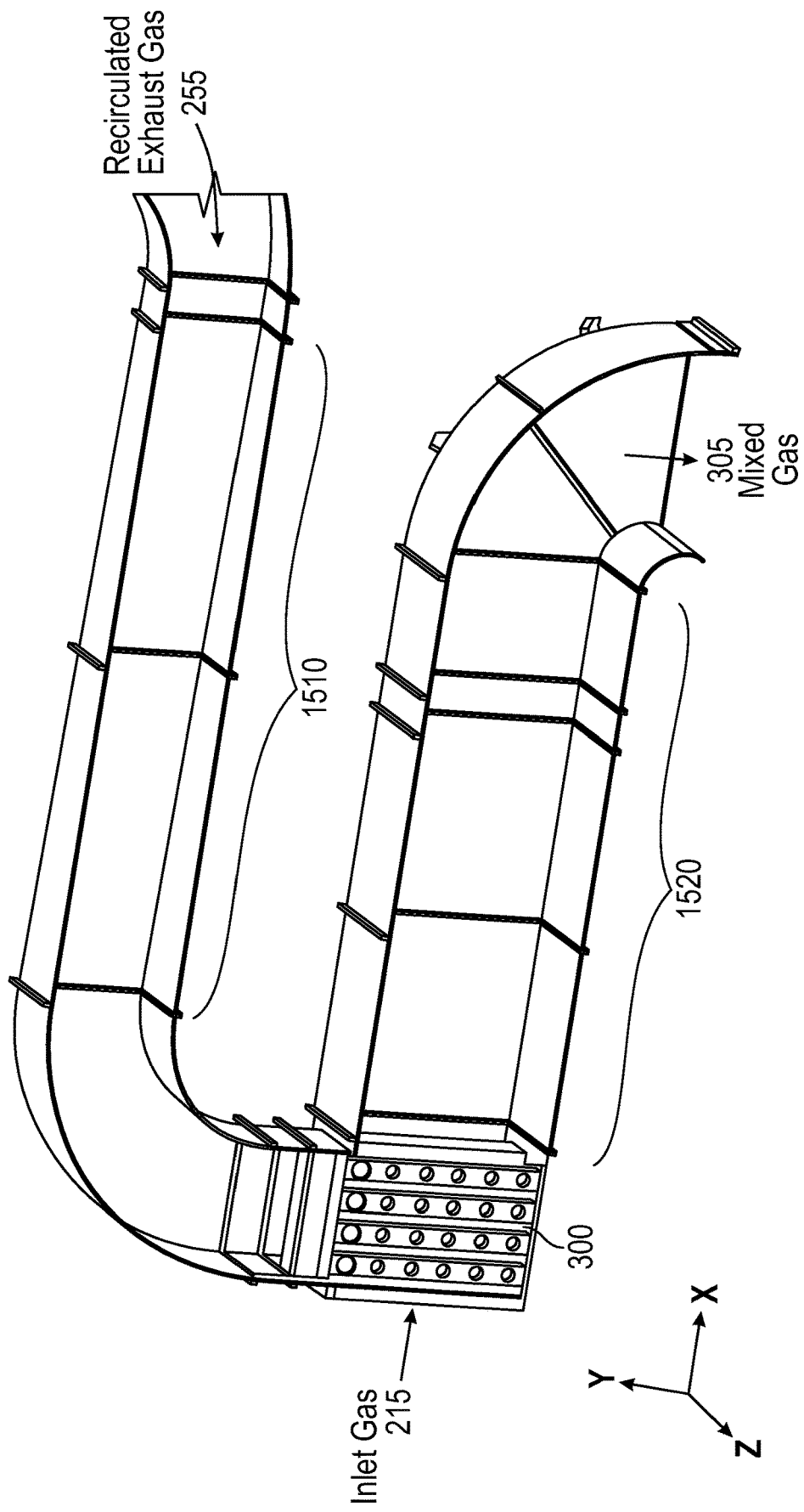
FIG. 15 illustrates a perspective cross-sectional view of a portion of a closed system with a mixer box installed, according to an embodiment.

FIG. 15 illustrates a perspective cross-sectional view of a portion of closed system 200 with mixer box 300 installed, according to an embodiment. During operation, inlet gas 215, output by air inlet 210, flows into first duct 310 of mixer box 300 along the X axis. It should be understood that the flow path of inlet gas 215 is split by leading surface 410 of each mixer 400 into channels 315, such that inlet gas 215 flows between mixers 400. Simultaneously, recirculated exhaust gas 255, output by the exhaust recirculation system (e.g., output by oxygen mixer 250), flows into second duct 320 of mixer box 300 along the Y axis. It should be understood that the flow path of recirculated exhaust gas 255 is split by fairings 330 into channels 335, such that recirculated exhaust gas 255 flows through openings 312 in first duct 310 and into the hollow interiors of mixers 400. Within the hollow interiors of mixers 400, recirculated exhaust gas 255 may be further divided into channels formed by baffles 450 within each mixer 400. As recirculated exhaust gas 255 flows through the hollow interiors of mixers 400, recirculated exhaust gas 255 flows out of each mixer 400 through the column(s) of apertures 422 in trailing surface 420 and the column(s) of apertures 432 in side surfaces 430. Apertures 422 and 432 may have greater areas at the open end of each mixer 400 than at the closed end of each mixer 400, to produce a more uniform diffusion of recirculated exhaust gas 255 into inlet gas 215 flowing through channels 315. Recirculated exhaust gas 255, exiting apertures 422 and 432, mixes with inlet gas 215, flowing through channels 315, to produce mixed gas 305 as the working fluid F that is input to gas turbine engine 100.

As illustrated, recirculated exhaust gas 255 (e.g., output by oxygen mixer 250) may flow through a first length of duct 1510 before entering mixer box 300. First length of duct 1510 may be configured to ensure that the oxygen, added by oxygen mixer 260, is fully mixed into recirculated exhaust gas 255, prior to entering mixer box 300. In an embodiment, first length of duct 1510 may be a diffuser that widens from the upstream end towards the downstream connection to mixer box 300, to slow the flow of recirculated exhaust gas 255 and to match the dimensions of the open end of second duct 320 in order to maximize the mixing potential within mixer box 300. Similarly, mixed gas 305 may flow through a second length of duct 1520 after exiting mixer box 300. Second length of duct 1520 may be configured to ensure that inlet gas 215 and recirculated exhaust gas 255 are fully mixed, prior to entering compressor 120 of gas turbine engine 100.

While the primary flow path through first duct 310 is described herein as a flow path for inlet gas 215, and the secondary flow path through second duct 320 is described herein as a flow path for recirculated exhaust gas 255, in an alternative embodiment, the flow paths could be switched. In this case, recirculated exhaust gas 255 may flow into the open upstream end of first duct 310, whereas inlet gas 215 may flow through second duct 320, through openings 312, into mixers 400, and out of apertures 422 and 432. It should be understood that the other components of closed system 200 may be adapted to account for this different configuration of flow paths.

Each of the components of mixer box 300 may be made of any suitable material. In an embodiment, the components are fabricated out of stainless steel, such as grade-304 stainless steel. However, it should be understood that the components may be fabricated from other materials, such as carbon steel. In addition, all of the components of mixer box 300 may be fabricated from the same material, or one or more components of mixer box 300 may be fabricated from a different material than one or more other components of mixer box 300.

INDUSTRIAL APPLICABILITY

In a closed system 200 that recirculates exhaust gas 225 from a gas turbine engine 100, recirculated exhaust gas 255 should be mixed with inlet gas 215 in a manner that does not create an excessive pressure drop, since an excessive pressure drop can be detrimental to the performance of gas turbine engine 100. The performance of gas turbine engine 100 may also suffer if the distribution of gases within the resulting mixed gas 305, entering gas turbine engine 100, is not relatively uniform. This can be especially problematic when site constraints and/or other design constraints limit the duct length in which inlet gas 215 and recirculated exhaust gas 255 are mixed.

Accordingly, a mixer box 300 is disclosed for efficient mixing of inlet gas 215 and recirculated exhaust gas 255, to produce a mixed gas 305 with acceptably uniform distribution, within a short duct length and without an excessive pressure drop. Mixer box 300 is compact, such that existing closed systems 200 may be easily retrofitted with mixer box at the existing point of mixing. Alternatively, a closed system 200 may be constructed, in the first place, with mixer box 300.

Mixer box 300 produces a more uniform distribution in mixed gas 305 by virtue of mixers 400. In particular, each mixer 400 extends the entire length of the Y axis between a first side and a second side of first duct 310. Thus, as recirculated exhaust gas 255 flows through openings 315 in the first side of first duct 310, recirculated exhaust gas 255 does not simply turn into the primary flow path through first duct 310. Rather, because recirculated exhaust gas 255 is channeled into the hollow interiors of mixers 400, the flow of recirculated exhaust gas 255 is forced to extend along the entire length of the Y axis between the first side and the second side of first duct 310. In other words, the secondary flow path of recirculated exhaust gas 255 is forced perpendicular to the primary flow path along the entire height of the primary flow path in the Y axis. In addition, mixers 400 may extend the entire length of first duct 310, along the X axis, from the open upstream end to the open downstream end. Thus, the secondary flow path of recirculated exhaust gas 255 is also forced to extend the entire length of first duct 310. This extension of the secondary flow path through the primary flow path along both the X and Y axes promotes more uniform mixing by providing more uniform injection of recirculated exhaust gas 255 into the flow path of inlet gas 215.

Furthermore, apertures 422 and 432, which provide flow paths from the hollow interior to the exterior of each mixer 400, may have areas that increase in area from the closed end to the open end of each mixer 400. This increases the volume of recirculated exhaust gas 255 that is ejected from the apertures 422/432 that are closer to the open end of mixer 400, relative to apertures 422/432 that are closer to the closed end of mixer 400, in order to compensate for the natural bias of recirculated exhaust gas 255 to remain in the secondary flow path until reaching the closed end of mixer 400. Thus, the volume of recirculated exhaust gas 255 that is ejected from apertures 422/432 is more uniform across the entire length of mixer 400 along the Y axis, to again promote more uniform mixing by providing more uniform injection of recirculated exhaust gas 255 into the flow path of inlet gas 215.

In addition, each mixer 400 may comprise baffles 450 that divide the hollow interior into channels. The separation of the hollow interior of each mixer 400 into these channels helps to prevent the formation of a vortex within the hollow interior of mixer 400. Such a vortex may create a low-pressure area within mixer 400, which could cause an ingress of gas into mixer 400. Thus, baffles 450 also promote more uniform mixing by facilitating higher pressure within the hollow interior of mixer 400.

Unless explicitly excluded, the use of the singular to describe a component, structure, or operation does not exclude the use of plural such components, structures, or operations, or their equivalents. The use of "a", "an", "the", "at least one", "one or more," and similar terms in the disclosure (especially in the context of the appended claims) are to be construed to cover both the singular and the plural, unless otherwise indicated herein or clearly contradicted by the context. The use of the term "at least one" or "one or more of" followed by a list of one or more items (e.g., "at least one of A and B" or "one or more of A and B") is to be construed to mean one item selected from the listed items (e.g., A only, or B only) or any combination of two or more of the listed items (e.g., A and B; A, A, and B; A, B, and B; A and A; B and B; and so on), unless otherwise indicated herein or clearly contradicted by the context. Similarly, as used herein, the word "or" refers to any possible permutation of a set of items. For example, the phrase "A, B, or C" refers to at least one of A, B, or C, or any combination thereof, such as any of: A; B; C; A and B; A and C; B and C; A, B, and C; or a plurality of any item, such as A and A; B, B, and C; A, A, B, C, and C; and so on.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of machine. Hence, although the present embodiments are, for convenience of explanation, depicted and described as being implemented in a closed system with a gas turbine engine, it will be appreciated that it can be implemented in various other types of systems in which gases are mixed, and with various other types of machines in various other environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A mixer box comprising:
    a first duct that includes
        an upstream end and a downstream end, along a first axis, that are both open to form a first flow path through the first duct along the first axis,
        a first side and second side, along a second axis that is perpendicular to the first axis, the first side comprising one or more openings, and
        one or more mixers that each extends along the first axis between the upstream end and the downstream end, and extends along the second axis between the first side and the second side, such that the first flow path is divided into a plurality of channels,
    wherein each of the one or more mixers has an open end, at the first side, that is aligned with one of the one or more openings in the first side, such that a second flow path, perpendicular to the first flow path, is formed through the first side into a hollow interior of the mixer, and wherein each of the one or more mixers includes two side surfaces, each of the two side surfaces including a plurality of apertures that decrease in area as a distance from the open end of the mixer increases, each aperture forming a flow path between the hollow interior of the mixer and one of the plurality of channels.

2. The mixer box of claim 1, wherein the plurality of apertures are arranged in each of the two side surfaces of each of the one or more mixers in two dimensions along both the first axis and the second axis.

3. The mixer box of claim 1, wherein each of the one or more mixers comprises a trailing surface, and wherein the trailing surface includes a plurality of apertures that each forms a flow path between the hollow interior of the mixer and an exterior of the mixer.

4. The mixer box of claim 3, wherein the plurality of apertures in each trailing surface of each of the one or more mixers decrease in area as a distance from the open end of the mixer increases.

5. The mixer box of claim 1, wherein the one or more mixers are a plurality of mixers.

6. The mixer box of claim 5, wherein the plurality of mixers comprise at least three mixers.

7. The mixer box of claim 1, wherein each of the one or more mixers comprises a curved leading surface.

8. The mixer box of claim 1, wherein each of the one or more mixers comprises one or more baffles that each extends along the second axis, such that the hollow interior of the mixer is divided into a plurality of channels along the second axis.

9. The mixer box of claim 8, wherein each of the plurality of channels in the hollow interior of each of the one or more mixers is aligned with a column of the plurality of apertures in each of the two side surfaces of the mixer.

10. The mixer box of claim 9, wherein at least one of the two side surfaces of each of the one or more mixers comprises a drainage hole through an edge of the side surface that is opposite the open end of the mixer along the second axis.

11. The mixer box of claim 1, further comprising a second duct includes a first end and a second end, along the second axis, wherein the second duct is affixed to the first side of the first duct at the first end, and the first end and the second end are both open to extend the second flow path of each of the one or more mixers through the second duct.

12. The mixer box of claim 11, wherein the second duct houses one or more fairings that split the second flow path through the second duct into a plurality of channels.

13. The mixer box of claim 12, wherein each of the plurality of channels of the second flow path through the second duct is aligned with one of the one or more openings in the first side of the first duct, such that each of the plurality of channels of the second flow path through the second duct is in fluid communication with the open end of one of the one or more mixers through the aligned opening.

14. The mixer box of claim 12, wherein the one or more mixers are at least three mixers, and wherein the one or more fairings are at least two fairings.

15. A system comprising:
an air inlet;
a gas turbine engine;
an exhaust recirculation system; and
a mixer box that comprises
a first duct that includes
an upstream end and a downstream end, along a first axis, that are both open to form a first flow path through the first duct along the first axis, the first flow path in fluid communication with an output of the air inlet on the upstream end and an inlet of the gas turbine engine on the downstream end,
a first side and second side, along a second axis that is perpendicular to the first axis, the first side comprising one or more openings, and
one or more mixers that each extends along the first axis between the upstream end and the downstream end, and extends along the second axis between the first side and the second side, such that the first flow path is divided into a plurality of channels,
wherein each of the one or more mixers has an open end, at the first side, that is aligned with one of the one or more openings in the first side, such that a second flow path, perpendicular to the first flow path, is formed through the first side into a hollow interior of the mixer, each second flow path in fluid communication with an output of the exhaust recirculation system, and
wherein each of the one or more mixers includes two side surfaces, each of the two side surfaces including a plurality of apertures that each forms a flow path between the hollow interior of the mixer and one of the plurality of channels.

16. The system of claim 15, wherein the plurality of apertures in each of the two side surfaces of each of the one or more mixers decrease in area as a distance from the open end of the mixer increases, and wherein the plurality of apertures are arranged in each of the two side surfaces of each of the one or more mixers in two dimensions along both the first axis and the second axis.

17. The system of claim 15, wherein each of the one or more mixers comprises a trailing surface, wherein the trailing surface includes a plurality of apertures that each forms a flow path between the hollow interior of the mixer and an exterior of the mixer, and wherein the plurality of apertures in each trailing surface of each of the one or more mixers decrease in area as a distance from the open end of the mixer increases.

18. The system of claim 15, wherein each of the one or more mixers comprises one or more baffles that each extends along the second axis, such that the hollow interior of the mixer is divided into a plurality of channels along the second axis, and wherein each of the plurality of channels in the hollow interior of each of the one or more mixers is aligned with a column of the plurality of apertures in each of the two side surfaces of the mixer.

19. A mixer box comprising:
a first duct that includes
an upstream end and a downstream end, along a first axis, that are both open to form a first flow path through the first duct along the first axis,
a first side and second side, along a second axis that is perpendicular to the first axis, the first side comprising a plurality of openings, and
a plurality of mixers that each extends along the first axis between the upstream end and the downstream end, and extends along the second axis between the first side and the second side, such that the first flow path is divided into a plurality of channels,
wherein each of the plurality of mixers has an open end, at the first side, that is aligned with one of the plurality of openings in the first side, such that a second flow path, perpendicular to the first flow path, is formed through the first side into a hollow interior of the mixer,
wherein each of the plurality of mixers includes two side surfaces, each of the two side surfaces including a plurality of apertures that each forms a flow path between the hollow interior of the mixer and one of the plurality of channels, the plurality of apertures, in each of the two side surfaces of each of the plurality of mixers, arranged in two dimensions along both the first axis and the second axis and decreasing in area as a distance from the open end of the mixer increases, wherein each of the plurality of mixers comprises a trailing surface, the trailing surface including a plurality of apertures that each forms a flow path between the hollow interior of the mixer and an exterior of the mixer, the plurality of apertures in each trailing surface of each of the plurality of mixers decreasing in area as a distance from the open end of the mixer increases, and wherein each of the plurality of mixers comprises one or more baffles that each extends along the second axis, such that the hollow interior of the mixer is divided into a plurality of channels along the second axis.

* * * * *